Figure 1:
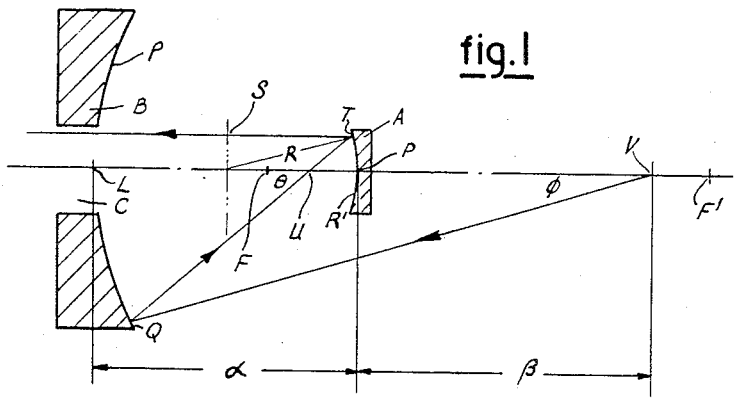

July 13, 1954  R. L. DREW  2,683,393
REFLECTING OBJECTIVE FOR MICROSCOPES
Filed May 16, 1950  4 Sheets-Sheet 1

Inventor
Robert L. Drew
By Watson, Cole, Grindle & Watson
Attorneys

July 13, 1954  R. L. DREW  2,683,393
REFLECTING OBJECTIVE FOR MICROSCOPES
Filed May 16, 1950  4 Sheets-Sheet 2

Inventor
Robert L. Drew
By
Watson, Cole, Grindle & Watson
Attorneys

July 13, 1954    R. L. DREW    2,683,393
REFLECTING OBJECTIVE FOR MICROSCOPES
Filed May 16, 1950    4 Sheets-Sheet 4

Inventor
Robert L. Drew
By Watson, Cole, Grindle & Watson
Attorneys

Patented July 13, 1954

2,683,393

UNITED STATES PATENT OFFICE 2,683,393

REFLECTING OBJECTIVE FOR MICROSCOPES

Robert Lionel Drew, Westbury-on-Trym, Bristol, England

Application May 16, 1950, Serial No. 162,153

Claims priority, application Great Britain May 20, 1949

7 Claims. (Cl. 88—57)

The present invention relates to reflecting microscope objectives, the designs of which are based on the employment of a two-mirror optical system.

A common feature of two-mirror systems is that light rays are enabled to pass from the object to the image position by means of central holes pierced in either or both the mirrors.

A known form of reflecting microscope comprises a convex spherical mirror so disposed as to be facing a larger concave mirror having a hole pierced centrally through it. Such an arrangement might be called a Cassegrainian type of microscope after the practice in astronomy where telescopes of similar type are so named. Such microscopes suffer from the defect that the surface of best definition, i. e. the mid-focal surface or surface approximately midway between the astigmatic focal lines, is curved concavely towards the aperture from which the final light emerges. It is of the same sign and approximately of the same radius as the small mirror and this curvature is increased by the usual eyepiece such as the Huyghenian or Ramsden type.

Accordingly it is one object of the present invention to provide a microscope having an objective which comprises two mirrors, both concave, yielding a mid-focal image field which is either intrinsically flat or convex to the aperture from which the final light emerges so that in the latter case, when used in conjunction with the usual eye-piece, the final mid-focal image field is also flat.

Another object is to provide a microscope yielding a flat sagittal or flat tangential focal field or indeed any intermediate flat field condition.

Yet another object is to provide a microscope objective in which the obstruction ratio, that is, the ratio of the numerical aperture of the objective obscured either by the small mirror or rendered imoperative by the non-reflectivity of the central hole in either or both the mirrors, divided by the numerical aperture of the objective, is not larger than 1/4 (and preferably smaller). The value 1/4 is that generally regarded (in astronomy) as an upper limit above which fine detail representation is apt to be somewhat marred.

A further object of the present invention is to provide a microscope objective whose two reflecting surfaces are permanently fixed in their proper relative positions.

According to the invention a microscope comprises a concave spherical mirror and a larger concave non-spherical mirror, the two mirrors being arranged coaxially and face to face, the larger mirror being provided with a central aperture for the light to pass therethrough, the non-spherical larger mirror having a surface of rotation defined as the locus of a series of ellipsoids having one common focus at the object point and whose other foci lie progressively nearer to the object point as the aperture is increased so as to combine with the smaller spherical mirror to give a strictly aplanatic image of an object at a finite distance.

Further according to this invention the surface of rotation of the larger non-spherical mirror can be defined by an ellipsoid of revolution, but with the object point so located nearer to the larger mirror than the further focus, that in conjunction with the smaller spherical mirror the resulting image of an object at a finite distance is aplanatic within the tolerances, i. e., zero spherical abbreation and coma only such as to give an offense against the sine condition of ±.0025.

The spherical mirror and the larger non-spherical mirror are hereinafter referred to as the small mirror and the large mirror respectively.

Preferred forms of the invention will now be described with reference to the accompanying sectional diagrams, in which—

Figure 2:
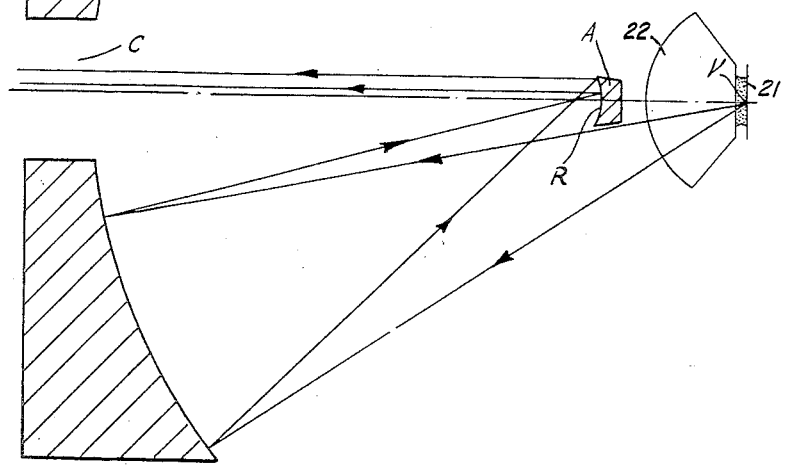
Figure 3:
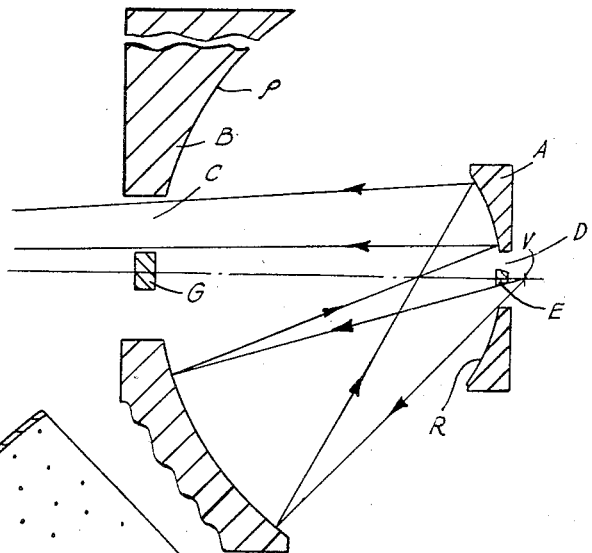

Figure 1 traces image-forming rays through an objective comprises the combination of a spherical and non-spherical, mirror Figure 2 illustrates the case where the small mirror obstructs the central portion of the large mirror, Figure 3 illustrates the case where rays from the object enter the objective through a central hole in the small mirror.

The forms illustrated in Figs. 2 and 3 should be used in conjunction with an eye-piece in order to obtain appropriate field flattening.

Figure 4:
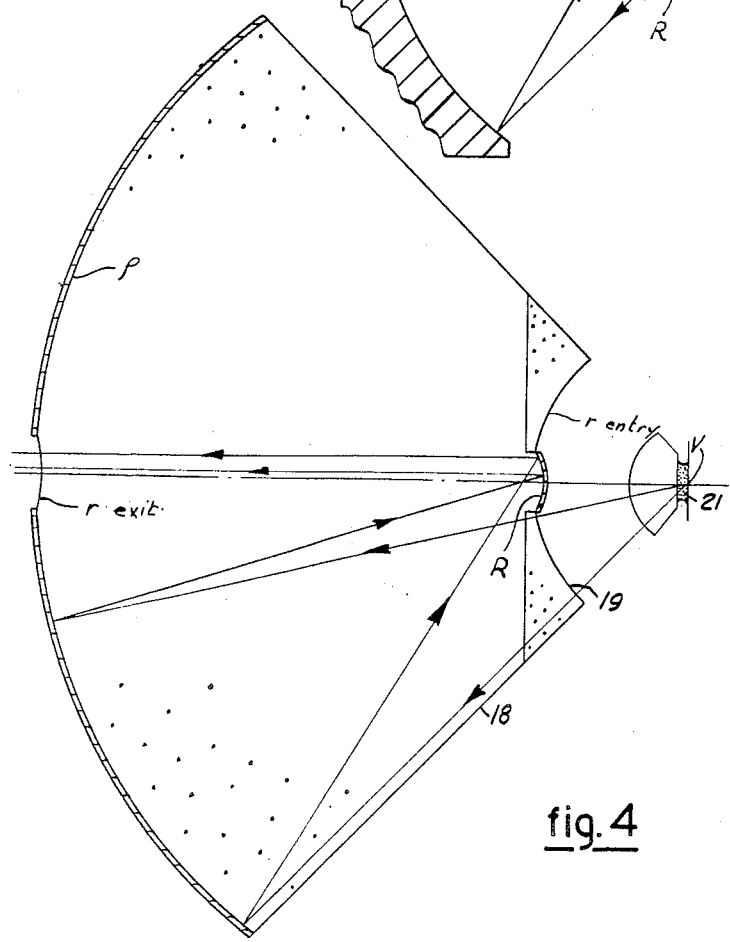
Figure 5:
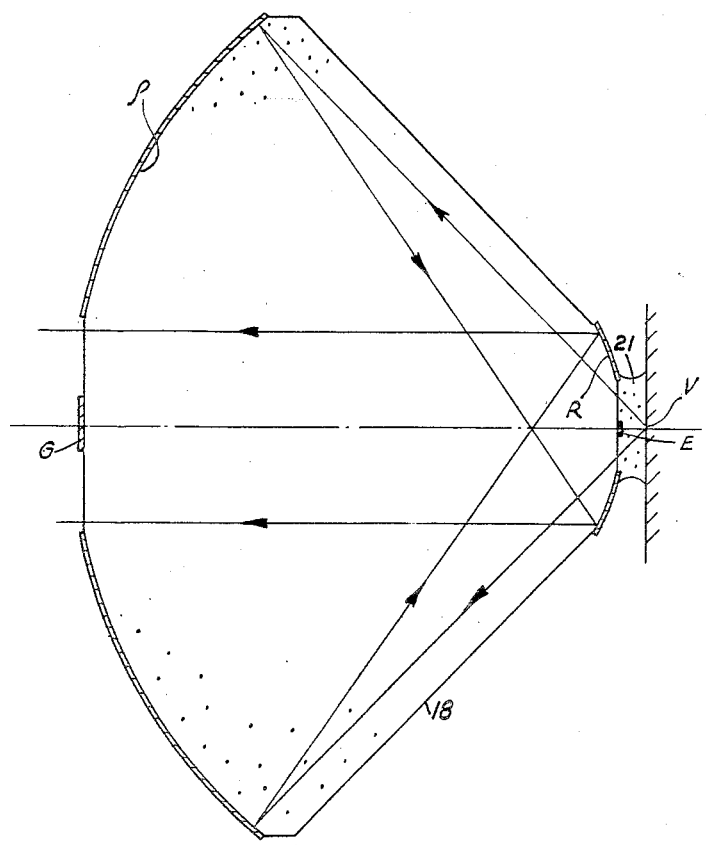
Figure 6:
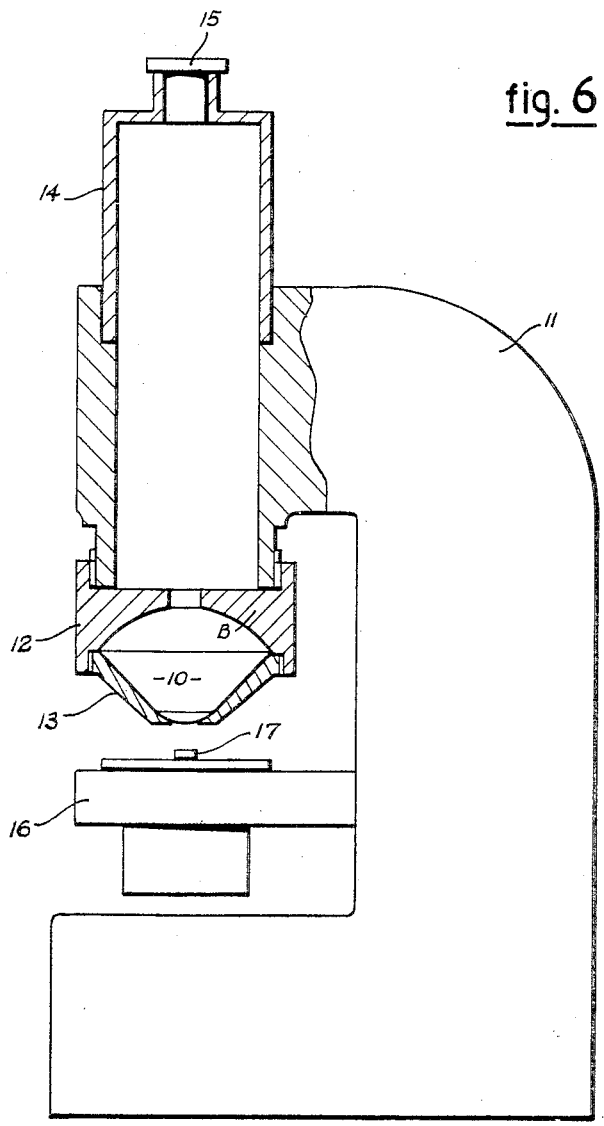

Figure 4 illustrates a case in which the objective can give an intrinsically flat image field, or one of such curvature as may be corrected by a suitable eye-piece, Figure 5 illustrates an oil-immersion type of objective provided by the present invention, having otherwise properties similar to the form shown in Fig. 4, and Figure 6 illustrates a microscope incorporating an objective according to this invention.

Referring now to Figure 1, the small mirror A and large mirror B have surfaces R' and $\rho$ respectively, the former being spherical and of radius R. The large mirror B has a central aperture C. In Figure 3, the small mirror A also has a central aperture D.

In order to satisfy the prime condition of aplanatism, viz:, freedom from spherical aberration, the two mirrors must be such that the spherical aberration associated with each shall be equal but of opposite sign. This is satisfied in general if the curve $\rho$ is a derivative of an ellipse in the sense that adjacent points on the curve are points of different ellipses, the eccentricity of said ellipses being a function of the numerical aperture, i. e. a function of sin $\phi$. More particularly the curve $\rho$ is the locus of points of different ellipses which have a common focus at the object point and whose other foci lie progressively nearer the object point as the aperture increases.

For most purposes a sufficient approximation to the curve $\rho$ is provided by arranging the surface to have an ellipsoidal form, so arranged that the object and paraxial intermediate image points lie not at the foci $FF^1$ (Fig. 1) of said ellipsoid, but at points V and U lying between the foci $FF^1$.

Supposing the large mirror to be figured so that the final image (at infinity) is free from spherical aberration, then the path length VQTS from the object point V to a point S on a plane through the centre of curvature of the "small" mirror $R_1$, must be a constant independent of $\theta$ (or $\phi$).

Let LP, the separation of the mirrors $=\alpha$ and PV, the distance from the object to the pole of the "small" mirror $R^1 = \beta$.

Then path $VQTS = \beta + 2\alpha + R =$ constant.

But if $e$ is the eccentricity and $a$ the semi major axis of the ellipse of which Q is a point and V and U are the foci then $$VQ + QU = 2a = \beta + 2\alpha + \frac{R}{2}\left(2 - 2\cos\frac{\theta}{2} - \sec\frac{\theta}{2}\right)$$

and $$VU = 2ae = \beta + \frac{R}{2}\left(2 - \sec\frac{\theta}{2}\right)$$

So that the eccentricity $$e = \frac{\beta + \frac{R}{2}\left(2 - \sec\frac{\theta}{2}\right)}{\beta + 2\alpha + \frac{R}{2}\left(2 - 2\cos\frac{\theta}{2} - \sec\frac{\theta}{2}\right)}$$

In order to satisfy the second requirement of aplanatism, namely, freedom from "coma" we must choose $e$ such that the offence against the "sine condition" is a minimum over the aperture required.

The geometry of the ellipse gives that $$\sin\phi = \frac{2(1-e^2)\cos\frac{\theta}{2}\sin\frac{\theta}{2}}{(1+e)^2 - 4e\sin^2\frac{\theta}{2}}$$

a ray at angle $\phi$ being imaged at height $$R\sin\frac{\theta}{2}$$

Thus to satisfy the sine condition exactly we must have $$\frac{\sin\phi}{2\sin\frac{\theta}{2}} = \text{constant}$$

which implies:

$$\frac{(1-e^2)\cos\frac{\theta}{2}}{(1+e)^2 + 4e\sin^2\frac{\theta}{2}}$$

must be independent of $\theta$.

The value of $e$ for $\theta=0$, viz., $e_0$, is so chosen as to give a minimum offense against the sine condition and in any case for it to be within the tolerance ($\pm.0025$).

The offence is given by $$1 - \frac{(1-e^2)\cos\frac{\theta}{2}}{(1+e)^2 - 4e\sin^2\frac{\theta}{2}} \times \left(\frac{1+e_0}{1-e_0}\right)$$

and can be tabulated for given values of $\alpha$; $\beta$; R and $e_0$.

The following table gives a typical example of the results with two varieties of objective falling within the scope of the present invention, and shows that apertures up to 0.6 and higher are possible with an eccentricity of low value (and hence a relatively small departure from the spherical shape, for example 0.04 mm.):

|  | Type A | | Type B | |
|---|---|---|---|---|
| $\theta°$ | Numerical Aperture | Coma Offence | Numerical Aperture | Coma Offence |
| 10 | .122 | −.000264 | .133 | .000563 |
| 20 | .244 | −.00133 | .265 | −.00106 |
| 30 | .363 | −.00181 | .395 | −.00172 |
| 40 | .480 | −.00221 | .522 | −.00131 |
| 50 | .622 | −.00137 | .643 | .00156 |
| 60 | .734 | .0018 | .755 | .008 |
| $e_0$ | .1761 | | .1347 | |
| $\frac{\beta}{R}$ | 3.45325 | | .127917 | |
| $\frac{\alpha}{R}$ | 9.74563 | | 2.516231 | |
| Obstruction | $\frac{1}{4.838}$ | | $\frac{1}{5.126}$ | |

Type A is a long working distance objective (as shown in Figs. 2 and 4), whereas type B is of the kind illustrated in Figs. 3 and 5. In these latter cases stops are provided to prevent "sky flooding," i. e., direct passage of light through the device without reflection. The stops are designated E and G, respectively.

Microscope objectives according to the present invention are characterised by values of $\alpha$; $\beta$; R and $e_0$ (together with such variations from the values given previously, as are required to form the final image at a finite distance—commonly called the tube length) such as to satisfy the demands of aplanatism within the tolerances hereinbefore defined.

In the prior art it is known that the Petzval curvature and astigmatism can be computed for a given optical system, which in this case is given by astigmatic interfocal distance (i. e. distance between the astigmatic focal lines):

$$= \frac{2-\alpha}{2(\beta+\alpha)} \cdot \frac{h^2}{F^2}$$

at off-axis height $h$, where the convention here is to regard $\alpha$ and $\beta$ as negative; F is the actual focal length of the combination, while $\alpha$ and $\beta$ refer to a system of unit focal length.

The field curvature convex to the exit hole is given by $$\frac{(\beta+\alpha-1)^2 + \alpha(1-\alpha)}{2(\beta-\alpha)\alpha} \cdot \frac{h^2}{F^2}$$

it is convex to the exit hole and therefore of a sign capable of correction by an eye-piece of the usual type having an equal but opposite field curvature. The resulting image field is flat.

Referring now to Fig. 4, the spherical surfaces R and $\rho$ are provided on surfaces of a block 18 of transparent medium of refractive index $n$ which can be coated with e. g. aluminum, to give a high reflecting power. Such an external coating also has the advantage of not being liable to contamination or deterioration. Surfaces 19 and 20, having radii denoted $r$ entry and $r$ exit, are spherical and are centered on the object point V and the image point respectively. Thereby light enters and leaves the objective normally.

This introduces no changes in the requirements for aplanatism but merely a contribution to the astigmatism and Petzval curvature of the image field.

This can be calculated and for the present case reduces to a field flattening contribution of:

$$\frac{n-1}{2}\left(\frac{1}{r \text{ entry}}+\frac{1}{r \text{ exit}}\right)h^2$$

of opposite sign to the intrinsic field curvature of the objectives.

For a flat mid-focal field we would therefore equate the quantities:

$$\frac{(n-1)}{2}\left(\frac{1}{r \text{ entry}}+\frac{1}{r \text{ exit}}\right)h^2=$$

$$\frac{(\beta+\alpha-1)^2+\alpha(1-\alpha)}{2(\beta+\alpha)\alpha}\times\frac{h^2}{F^2}$$

again together with such small variations as are introduced by forming the image at a finite distance.

This means that by use of the block 18, spherical entry and exit surfaces can be introduced in such a manner as to so modify the Petzval and astigmatic coefficients of the system that a flat mid-focal field results. The values of $n$, $r$ exit and $r$ entry are so chosen in conjunction with $\alpha$, $\beta$ and R that an intrinsically flat field results or such optimum curve as may be desired to match in with a normal eye-piece or for other purposes.

To provide a similar solid version of the type illustrated in Figure 3 would entail construction of a normal incidence entry surface having of necessity such small radius as to preclude its successful manufacture and therefore in its place is used the objective illustrated in Figure 5 which is essentially an oil immersion type. It is used with an immersion medium 21 to match the block of transparent material 18 of index $n$ used in its construction, so that light enters the material again with no refraction, thus retaining the advantages outlined heretofore whilst further increasing the effective numerical aperture (defined as $n \sin \phi$) of the objective.

As can be seen from the tables the numerical aperture of these objectives can be at least 0.65 in the case of Figures 2, 3, and 4, and $n\times 0.65=0.975$ for $n=1.5$ for type 5.

Further, types 2 and 4 may be used in conjunction with a "normal incidence" oil component 22 as shown in Figures 2 and 4 with the appropriate adjustments in "$r$ exit" and "$r$ entry" as are required—thereby again increasing the effective aperture to the order of 0.9 or greater.

Having chosen the values desired for the various quantities, the sphere corresponding to R and the initial sphere corresponding most closely to $\rho$ may be so set in their correct relative position that by means of knife edge or interference tests and such like optical methods it may be observed how far the initial spherical approximation (i. e. considering initially R and $\rho$ as spheres only) deviates from the condition of zero spherical aberration and minimum coma.

By use of any appropriate optical working method, material is removed from the $\rho$ "sphere" until the testing methods indicate that the conditions of aplanatism have been fulfilled, i. e. when the $\rho$ surface is of the correct aspherical curve as defined by the present invention.

Referring to Fig. 6 an objective 10 is secured to a frame 11 by means of a socket 12 and a screw threaded cap 13. The objective used in this example is of the type illustrated in Fig. 5. A tube 14 and an eye piece 15 are provided above the objective. A stage or platform 16 is mounted on the base of the frame 10 and carries a specimen 17. Conventional adjustments (not shown) are provided in respect of the stage to enable the specimen to be moved relatively to the objective. Also, an appropriate sub-stage condenser, preferably a reflecting one, and other conventional adjustments and accessories are provided.

What I claim and desire to secure by Letters Patent is:

1. A microscope objective comprising a concave spherical mirror and a larger concave non-spherical mirror, the two mirrors being arranged coaxially and face to face and having a common midfocal plane therebetween, the larger mirror being provided with a central aperture for the light beam from the smaller mirror to pass therethrough, the non-spherical larger mirror having a reflecting surface of rotation formed as the locus of a series of ellipsoids having one common focus adjacent the midfocal plane of the system and whose other foci lie progressively nearer to the said second common focus and to the object plane as the aperture is increased, the smaller concave mirror being positioned to have its principal focal point and the one conjugate focal point of the non-spherical larger mirror at the common midfocal plane and the second conjugate focal plane of the larger mirror at the object plane whereby the said larger concave mirror will combine with the spherical smaller mirror to give a strictly aplanatic image of an object located at a finite distance at said object plane.

2. A microscope objective according to claim 1 wherein a central hole is also provided in the spherical mirror together with appropriate stops to prevent sky flooding.

3. A microscope objective according to claim 1, in which the mirror surfaces are formed on the external surface of an integral block of transparent material of refractive index between 1.3 and 2.0 and with a normal entry surface and a transparent normal exit surface such that the light may enter and leave the block normally without introducing chromatic or other focal errors.

4. A microscope objective according to claim 1, in which the mirror surfaces are formed on the external surface of a block of transparent material of refractive index between 1.3 and 2.0, said block being made up of two or more pieces in optical contact and with a normal entry surface and a transparent normal exit surface such that the light may enter and leave the block normally without introducing chromatic or other focal errors.

5. A microscope objective according to claim 4, wherein the mirror surfaces are provided with a high reflecting power by an external deposition of a layer of suitable metal.

6. A microscope objective according to claim 1 when combined with a normal incidence oil component so as to increase the effective numerical aperture.

7. A microscope objective according to claim 1 in combination with a normal eye-piece so matched as to yield a flat image field.

References Cited in the file of this patent

UNITED STATES PATENTS

| Number | Name | Date |
|---|---|---|
| 1,578,899 | Lohman | Mar. 30, 1926 |
| 1,763,630 | Hopkins | June 10, 1930 |
| 2,003,171 | Burrell | May 28, 1935 |
| 2,156,911 | Brown | May 2, 1939 |
| 2,166,102 | Wild | July 18, 1939 |
| 2,198,014 | Ott | Apr. 23, 1940 |
| 2,306,679 | Warmisham | Dec. 29, 1942 |
| 2,327,947 | Warmisham | Aug. 24, 1943 |
| 2,378,301 | Kaprelian | June 12, 1945 |
| 2,380,887 | Warmisham | July 31, 1945 |
| 2,403,660 | Hayward | July 9, 1946 |
| 2,477,331 | Epstein | July 26, 1949 |
| 2,478,762 | Johnson | Aug. 9, 1949 |
| 2,593,724 | Bouwers | Apr. 22, 1952 |

FOREIGN PATENTS

| Number | Country | Date |
|---|---|---|
| 82,671 | Germany | Aug. 7, 1895 |
| 688,797 | Germany | Mar. 2, 1940 |
| 699,472 | Germany | Nov. 29, 1940 |